United States Patent
Kauffeldt et al.

(10) Patent No.: US 9,301,027 B2
(45) Date of Patent: *Mar. 29, 2016

(54) REMOTE OPTICAL DEMARCATION POINT PROTECTION

(71) Applicants: Hal V. Kauffeldt, Plano, TX (US); Edward T. Sullivan, Highland Village, TX (US)

(72) Inventors: Hal V. Kauffeldt, Plano, TX (US); Edward T. Sullivan, Highland Village, TX (US)

(73) Assignee: TECHSYS INSIGHTS, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/204,998

(22) Filed: Mar. 11, 2014

(65) Prior Publication Data

US 2015/0147059 A1 May 28, 2015

Related U.S. Application Data

(63) Continuation-in-part of application No. 13/490,314, filed on Jun. 6, 2012, now Pat. No. 8,989,591.

(60) Provisional application No. 61/787,799, filed on Mar. 15, 2013.

(51) Int. Cl.
*H04Q 11/00* (2006.01)
*H04J 14/02* (2006.01)

(52) U.S. Cl.
CPC .......... *H04Q 11/0005* (2013.01); *H04J 14/02* (2013.01); *H04J 14/0221* (2013.01); *H04J 14/0254* (2013.01); *H04J 14/0275* (2013.01); *H04J 14/0273* (2013.01); *H04Q 2011/0007* (2013.01); *H04Q 2011/0015* (2013.01)

(58) Field of Classification Search
CPC .................. H04Q 11/0005; H04Q 2011/0007; H04Q 2011/0015
USPC ................................................. 398/48, 45, 43
See application file for complete search history.

(56) References Cited

U.S. PATENT DOCUMENTS

| | | | | |
|---|---|---|---|---|
| 8,989,591 B2* | 3/2015 | Kauffeldt | ............ | H04J 14/0275 398/135 |
| 2009/0074412 A1* | 3/2009 | Liu | ...................... | H04L 12/2697 398/59 |
| 2009/0310615 A1* | 12/2009 | Bernard | .............. | H04L 41/0893 370/401 |
| 2012/0321315 A1* | 12/2012 | Timm | ................. | H04Q 11/0067 398/67 |
| 2013/0011142 A1* | 1/2013 | Goodson | ............ | H04Q 11/0067 398/98 |
| 2014/0052814 A1* | 2/2014 | Graham | .............. | H04L 67/2842 709/217 |
| 2014/0226972 A1* | 8/2014 | Missett | ............... | H04L 43/0811 398/25 |
| 2015/0071634 A1* | 3/2015 | Sullivan | .................. | H04L 41/18 398/49 |
| 2015/0147059 A1* | 5/2015 | Kauffeldt | ........... | H04Q 11/0005 398/48 |

* cited by examiner

*Primary Examiner* — Oommen Jacob

(57) ABSTRACT

The invention is directed to apparatus, systems and methods enabling a service provider to establish an optical demarcation point located at or within equipment controlled at least in part by a customer's domain such that the service provider's domain is able to directly control access of an optical signal to their domain, while simultaneously offering one or more of equipment redundancy for the remote optical demarcation control equipment located at the service provider's edge node, equipment redundancy for transceiver equipment providing hot-standby optical signal origination, or hot-standby facility redundancy where one end of said facility redundancy is located at said service provider's edge node.

17 Claims, 10 Drawing Sheets

REMOTE OPTICAL DEMARCATION POINT PROTECTION

CROSS REFERENCE TO RELATED APPLICATIONS

This application is a continuation-in-part of application Ser. No. 13/490,314, titled "Remote Optical Demarcation Point", filed Jun. 6, 2012, included herein in its entirety by reference, and claims the benefit of U.S. Provisional Application No. 61/787,799 filed Mar. 15, 2013.

BACKGROUND OF THE INVENTION

It is common in modern optical networks for the ingress of the transport network to use an optical transponder as a termination point for converting a 'gray' low cost optical signal from a customer's optical interface to a 'colored' optical signal on a service provider's network element. The 'colored' optical signal, or Wavelength Division Multiplex (WDM) signal, is typically enhanced, or 'digitally wrapped' with Optical Transport Network (OTN) overhead to provide service transparency, performance management capabilities and Forward Error Correction (FEC) coding for increased optical reach across the transport network. The WDM signal may then be transmitted across one or more optical links and through numerous intermediate devices before reaching the egress point of the transport network. At the egress point the WDM signal is terminated optically, the OTN overhead is removed and processed, and the remaining signal is converted back to a 'gray' low cost optical signal for transmission to the customer.

The transponder serves as the demarcation point between the operation, control and ownership of facilities of the service provider's network, hereafter referred to as SP, and the customer premise equipment. Examples of customer premise equipment may include a server, router or switch located at the campus of a business or it could be a WDM Terminal or Reconfiguration Optical Add Drop Multiplexer (ROADM) edge node from an SP in a different administrative domain.

Additionally, it is often also desirable to provide various forms of redundancy for equipment and/or facilities within the SP's network. Redundancy enables the signal transport service provided to the customer by the SP to be maintained in the event of failures of either equipment or transmission spans. Various forms of equipment and facility protection are well known to those skilled in the art, and may be utilized singly or in combinations, or indeed not employed at all, in support of a given service instance.

FIG. 1 shows an example network wherein the operation, control and ownership domain of the SP is depicted in the shaded portion of the figure while the operation, control and ownership domain of the customer is depicted in the unshaded portion of the figure. Since the service edge network elements of the SP perform optical-to-electrical-to-optical (OEO) conversion on each incoming and outgoing signal to and from its network, it is able to isolate and verify the quality of the received customer optical signals as they enter the SP's network and it is able to isolate and verify the quality of the optical signals within the SP's network. If there is a problem, the SP is able to identify the source of the problem as either within or outside of its own network. The customer optical interfaces are here each connected to 2 different transponders (labeled TXP) at the corresponding edges of the SP's network. This allows the SP to provide protection for the signal conveyed between the customer optical interfaces by selectively controlling which one of the two routes within the SP's network is made active. In this figure, if any equipment or segment of the upper route fails, the lower route may be used as an alternate in order to maintain service, and vice versa.

Routing high speed optical signals across a transport network is very complicated. The signals may traverse long distances over multiple spans and through numerous nodes each of which may contain various components that impact the end to end quality of the optical signal. Example intermediate devices may include amplifiers (Erbium Doped Fiber Amplifier (EDFA) and Raman) and ROADMs of different types; all of which have the potential to impair the optical signal.

Many of the intermediate devices in current optical networks require time to stabilize their operation when the optical signals passing through them change in some appreciable manner. For example, many optical amplifiers perform operations such as channel power level balancing, gain flattening, and/or constant gain or constant power regulation of the composite optical signal being amplified, and some of these operations take several seconds or even minutes to compensate for changes in the optical signal characteristics, such as when an optical channel signal is added to or removed from the composite optical signal passing through the amplifier.

By way of example, referring again to FIG. 1, should the signal from a transponder on the upper route fail, the composite optical signal within the SP's network between the transponders at either end along that route will experience a change in characteristics, due to the loss of the optical signal from the failed transponder. If the lower route, acting as an alternate for the upper, is not already conveying an optical signal between the transponders at either end, the composite optical signal along that route may also experience a change when the SP's network activates an optical signal on the lower route providing protection for the customer's service.

Due to the potential adverse impacts on the composite signals and the time interval required to stabilize the elements along the route in the event of such changes, modern optical networks often provide such redundancy using a technique referred to as "hot standby". In a hot standby configuration, both the normally utilized ("normally working") and the alternate (or "redundant", "backup", "protection" or "hot-standby") routes convey optical signals between the ends of the two routes. Herein, the "hot standby" phraseology refers to the fact that the alternate route conveys an optical signal whose optical properties approximate that of the signal used when conveying the customer's signal along that route. In the FIG. 1 example wherein the lower route acts as a hot standby alternate for the upper, the selection of the route to be used for transporting the customer's signal between the customer optical interfaces would include controlling the selection of the spans between the customer optical interfaces and the transponders adjacent to them. By placing the customers information onto one or the other of the SP's optical routes, the SP is able to choose which of the routes is used to convey the information, and therefore to provide alternate routing in the event of a failure affecting one of the routes.

FIG. 2 depicts another prior art example of protected services. In this example, the SP provides two independent network routes, and protection is controlled by the customer. Such a configuration is sometimes used, by way of non-exhaustive example, to connect two IP routers. In such a configuration, the SP provides two routes, each of which is unprotected from their point of view. The customer is then free to utilize both of these routes, providing double the information transfer capacity when both routes are operable, and the ability to protect one half the prior total capacity by using the non-failed route when one route fails.

FIG. 3 depicts another prior art example of protected services. In this example, the customer optical interfaces are transported transparently through the SP's network utilizing support for alien wavelengths provided by the SP's network. As in FIG. 2, protection is controlled by the customer, and the SP view's each of the routes as independent and unprotected.

Co-pending application Ser. No. 13/490,314, titled "Remote Optical Demarcation Point", filed Jun. 6, 2012, hereby included in its entirety by reference, has disclosed apparatus, methods and systems which allow placing WDM transceivers at a customer site without breaking the traditional model of independent control currently employed by the SP. That invention also allows the example depicted in FIG. 2 to be changed into a configuration similar to that depicted in FIG. 3, with the difference that the customer optical interfaces become the demarcation points of the SP's network, and connect, in turn, to further customer equipment not shown in FIG. 3.

While the aforementioned co-pending application enables protected services to be provided within such further customer equipment, it does not address the means by which the SP may provide equipment and/or route protection in a scenario similar to that depicted in FIG. 1, with the difference that the customer optical interfaces have become remote optical demarcation points of the SP's network through the use of said co-pending invention.

Since a significant number of customer services similar to those depicted in FIG. 1 are offered by SP's, it is therefore desirable to provide apparatus, methods and systems which enable equipment and/or route protection to be realized in conjunction with the benefits of the remote optical demarcation point apparatus as disclosed by said co-pending non-provisional application. It is further desirable that said apparatus, methods and systems be compliant to relevant standards and recommendations, such as, but not limited to, ITU-T Recommendation G.698.2. It is still further desirable that said apparatus, methods and systems enable the simultaneous support of both equipment and route protection.

BRIEF SUMMARY OF THE INVENTION

We adopt the terms and their definitions "domain", "CPE", "Customer demarcation control channel" also referred to by the acronym "CCC", "data plane signal" and "alien wavelength" as defined previously in co-pending application Ser. No. 13/490,314, titled "Remote Optical Demarcation Point", filed Jun. 6, 2012. We will also refer to the Slave as defined therein, and to a Master which is an enhanced version of the same named element defined therein.

An objective of the present invention is to provide an apparatus, system and method of configuring and operating Master equipment in a manner which provides equipment redundancy of said Master equipment.

A further objective of the present invention is to provide an apparatus, system and method for providing hot-standby facility protection for an optical data plane signal traversing an SP's domain wherein said optical data plane signal passes through at least one Master.

A further objective of the present invention is to provide an apparatus, system and method for simultaneously configuring and operating Master equipment in a manner which provides equipment redundancy of said Master equipment while also providing facility protection, and preferably hot-standby facility protection, for an optical data plane signal traversing an SP's domain wherein said optical data plane signal passes through at least one of said Master equipment.

A further objective of the present invention is to define an apparatus, system and method for signaling information related to said hot-standby facility protection between the points which define the end points of said hot-standby facility protection within the SP's network.

A further objective of the present invention is to enable the service provider to monitor the optical data plane signal and/or the hot-standby facility optical signal for at least one of the following attributes herein referred to as "optical signal parameters"; the center wavelength(s), optical signal width(s), optical signal state(s) of polarization, transmitted and/or received optical signal power level(s), the operational on/off status(es), optical signal-to-noise ratio(s) (OSNR) of said signal(s), or parallel lane count.

A further objective of the invention is to provide a single solution that may be used in both intra-domain and inter-domain applications within and/or among metro, regional, long haul and hybrid optical networks for control of Master equipment and/or hot-standby facility protection associated with an optical data plane signal of an optical demarcation point with support for single and/or multi-channel optical links while being protocol, modulation rate, modulation format, and bit-rate independent.

As may be apparent from the embodiments disclosed herein, the invention offers several advantages over the prior art. Further, the inventive apparatus, systems and methods are not limited to the specific embodiments described herein. Other advantages may also be apparent, especially in certain specific cases where the invention may offer further advantages over the prior art.

DETAILED DESCRIPTION OF THE INVENTION

The present invention will now be described more fully, using a subset of its embodiments. Additional embodiments will be apparent to those skilled in the art and are covered by the claims of the invention.

The invention enhances the Master described in the aforementioned co-pending application Ser. No. 13/490,314, titled "Remote Optical Demarcation Point", filed Jun. 6, 2012, included, adding structural elements which support the provision of various redundancy features. References hereafter to Slave and CCC elements refer to the Slave and CCC elements as disclosed in said co-pending application Ser. No. 13/490,314.

Figure 1:
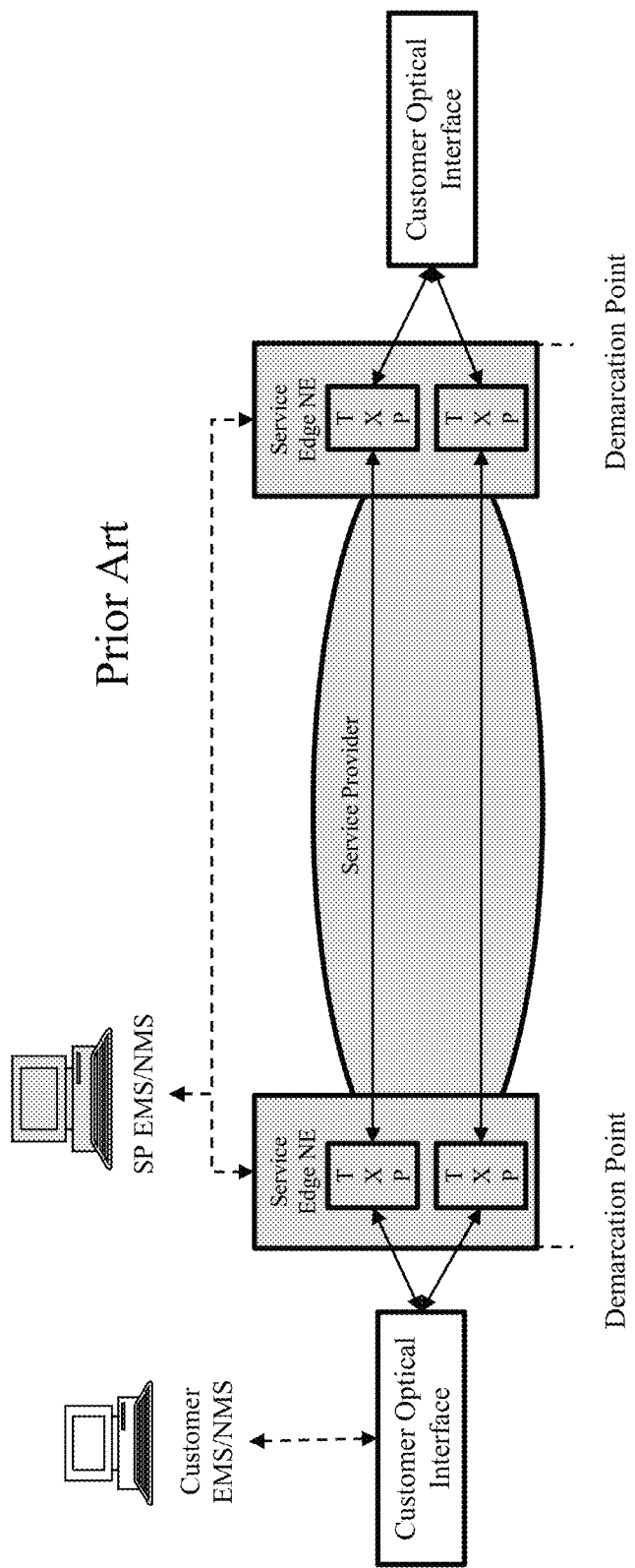
FIGS. 1-3 depict prior art examples of WDM demarcation points and/or arrangements between network equipment within the service provider domain and the corresponding customer equipment within the customer domain, wherein at least one of transponder equipment redundancy or SP route redundancy is provided.
Figure 2:
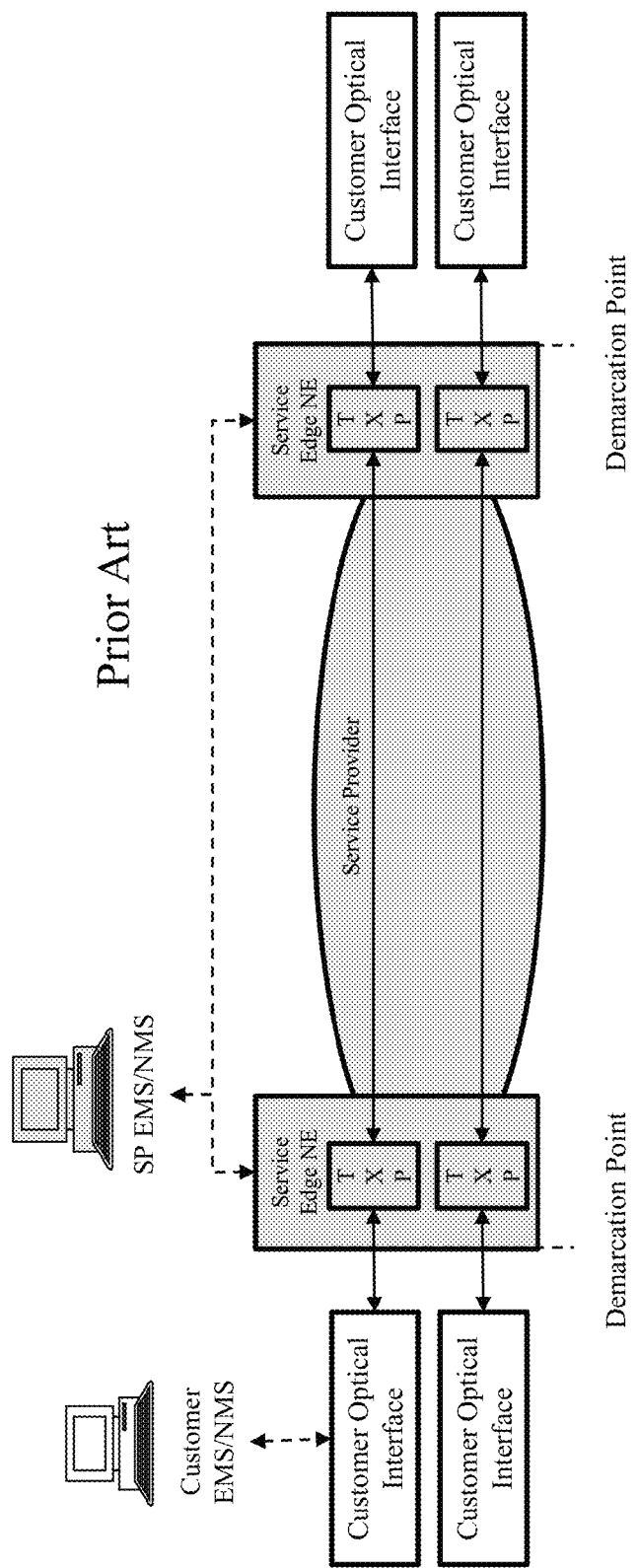
Figure 3:
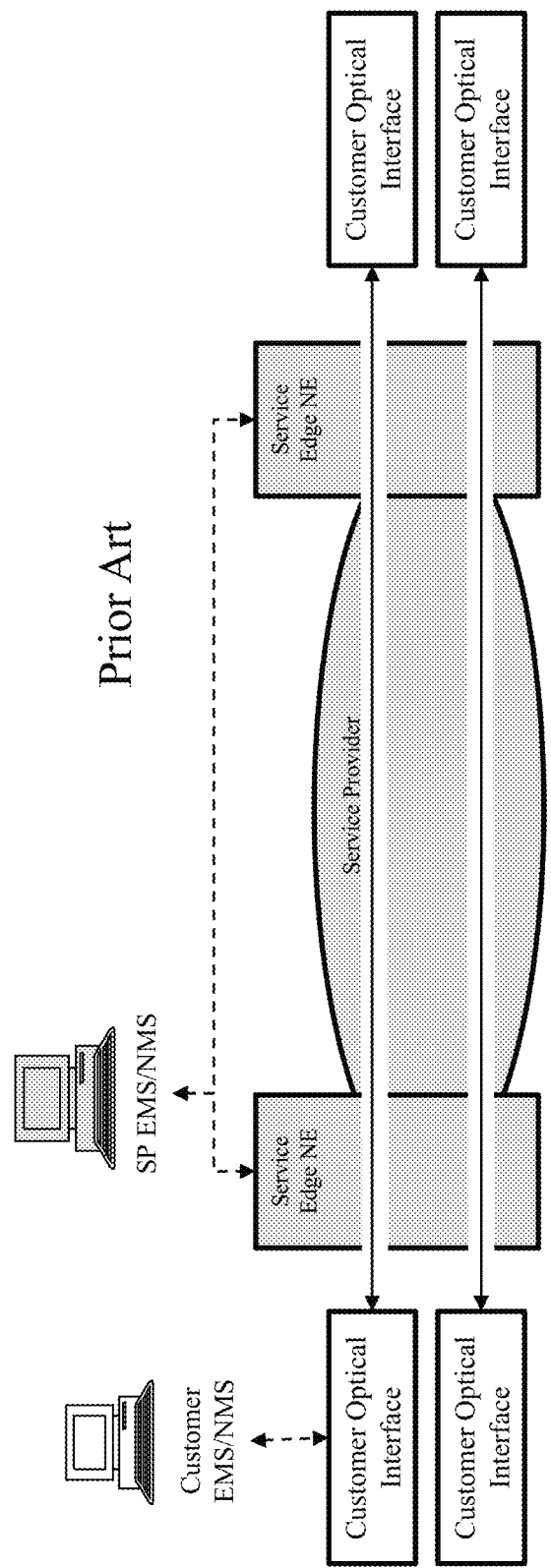
Figure 4:
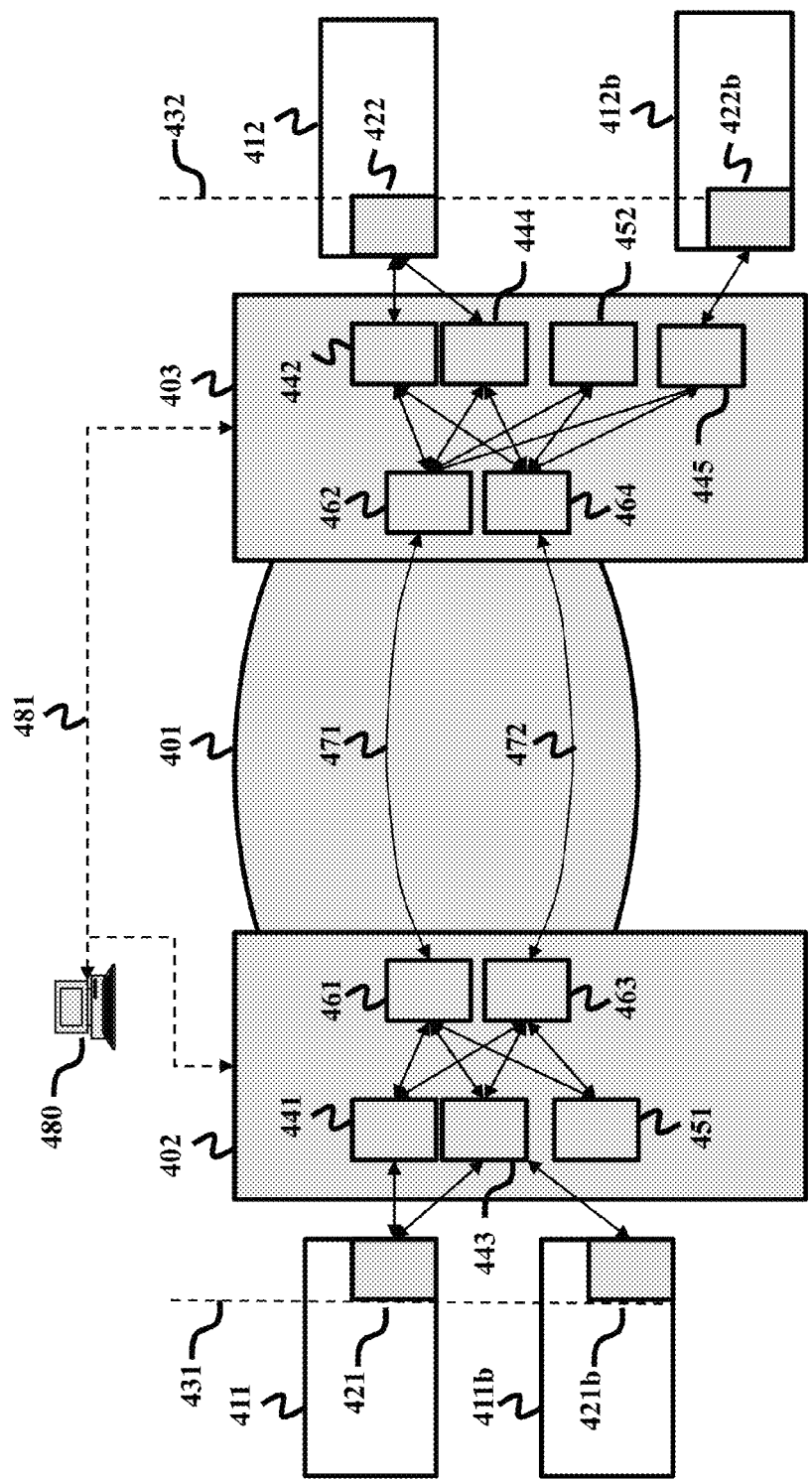
FIG. 4 depicts the domain boundaries and some element relationships consistent with the inventive proposal.

An example of the inventive system is depicted in FIG. 4. Customer equipment 411, 411b, 412 and 412b include Slave units 421, 421b, 422 and 422b, respectively. The demarcation points of the SP's network are correspondingly shown as items 431 and 432, respectively. The SP's control and management system 480 has independent and direct control over these Slave devices via control path 481 such that the SP has complete control over the optical data plane signals entering transport network 401.

Nodes 402 and 403 are edge nodes, interconnected via and forming portions of network 401. Slave 421 is connected to enhanced Masters 441 and 443 within node 402, while Slave 422 is connected to enhanced Masters 442 and 444 within node 403. The optical connections between the Slave and their corresponding Masters allow optical data plane signals and CCC signals to be conveyed, while the existence of a pair of Masters associated with any one Slave allows the system to provide redundancy of the Master equipment through control over the selection of which Master conveys the optical data plane signals between the Slave and the SP's network. Slave 421b is also connected to Master 443 in node 402, while Slave 422b is connected to Master 445 in node 403, enabling operation of an extra traffic optical data plane signal there between. FIG. 4 shows that a Slave may be connected to one or more Masters, that the number of Masters to which Slaves associated with a given optical data plane signal need not be the same at each node through which said optical data plane signal passes, and that a Master may connect to more than one Slave.

Node 402 also includes optional transceiver 451 while node 403 also includes optional transceiver 452. Transceivers 451 and 452 are the source and sink points for allowing an optical signal to flow there between. This optical signal allows devices along the path, such as ROADMs, optical amplifiers or other devices which require operational adjustments when the characteristics of optical signals passing through them change in some appreciable manner, to be operating in a known desired state. Although it is possible to employ a transceiver at only one edge node, it is typical that a transceiver is employed at each edge node where one or more Master(s) connect to respective Slaves.

Node 402 includes optical switching elements 461 and 463, while node 403 includes optical switching elements 462 and 464. The optical switching elements within each node are connected to both of the Masters and the transceiver within the same node. The optical switching elements thereby form a structure in which optical signals from any one optical switching element may travel between any of the Masters or the transceiver within the same node. Optical switching element 461 is also connected to optical switching element 462 via route 471, and optical switching element 463 is connected to optical switching element 464 via route 472. Although these routes may appear to follow different physical routes through network 401, this is merely for clarity of the example depicted in FIG. 4. It is possible that the routes may, for example, follow the same physical route, in whole or in part, and be differentiated from each other based upon the wavelengths used on the two routes if the routes employ wavelength division multiplexing. For simplicity, we will discuss the optical pathways of this and all other figures as if they are comprised of optical fibers, typically abbreviated to just "fiber", but in practice, any sort of optically conductive medium may be employed, including as examples but without any intent of limitation, optical waveguides or free-space optical pathways.

FIG. 4 also shows that it is possible for the inventive system, method and apparatus to support what is commonly referred to by those skilled in the art as "extra traffic". If, for example, the first optical data plane signal—for which path protection is provided—is routed between Slaves 421 and 422 over the normally working route 471, a second optical data plane signal may be conveyed between Slaves 421b and 422b via route 472. If this second optical data plane signal has the property that it will be interrupted in order to provide redundant route operation for the first optical data plane signal when the first signal needs to use route 472, the second signal is known as an extra traffic signal. As shown in FIG. 4, there are multiple ways in which the apparatus supports an extra traffic signal, including by sharing the use of a Master with another signal, as in the case of Master 443, or by using a separate Master as in the case of Master 445, or even a redundant Master pair (not shown). In the case of Master 443, the extra traffic signal path will be preempted whenever Master 443 must be used for the conveyance of the optical data plane signal(s) of Slave 421, whether this is due to switching of the route through the SP's network over which said optical data plane signal, or due to the need to provide Master equipment protection for Master 441. In the case of Master 445, the extra traffic signal path will be interrupted when the route within the SP's network is interrupted, either by a failure or by preemption due to the protection of other optical data plane signal(s), but not when Master equipment protection operations involving Masters 442 and 444 occurs.

Figure 5:
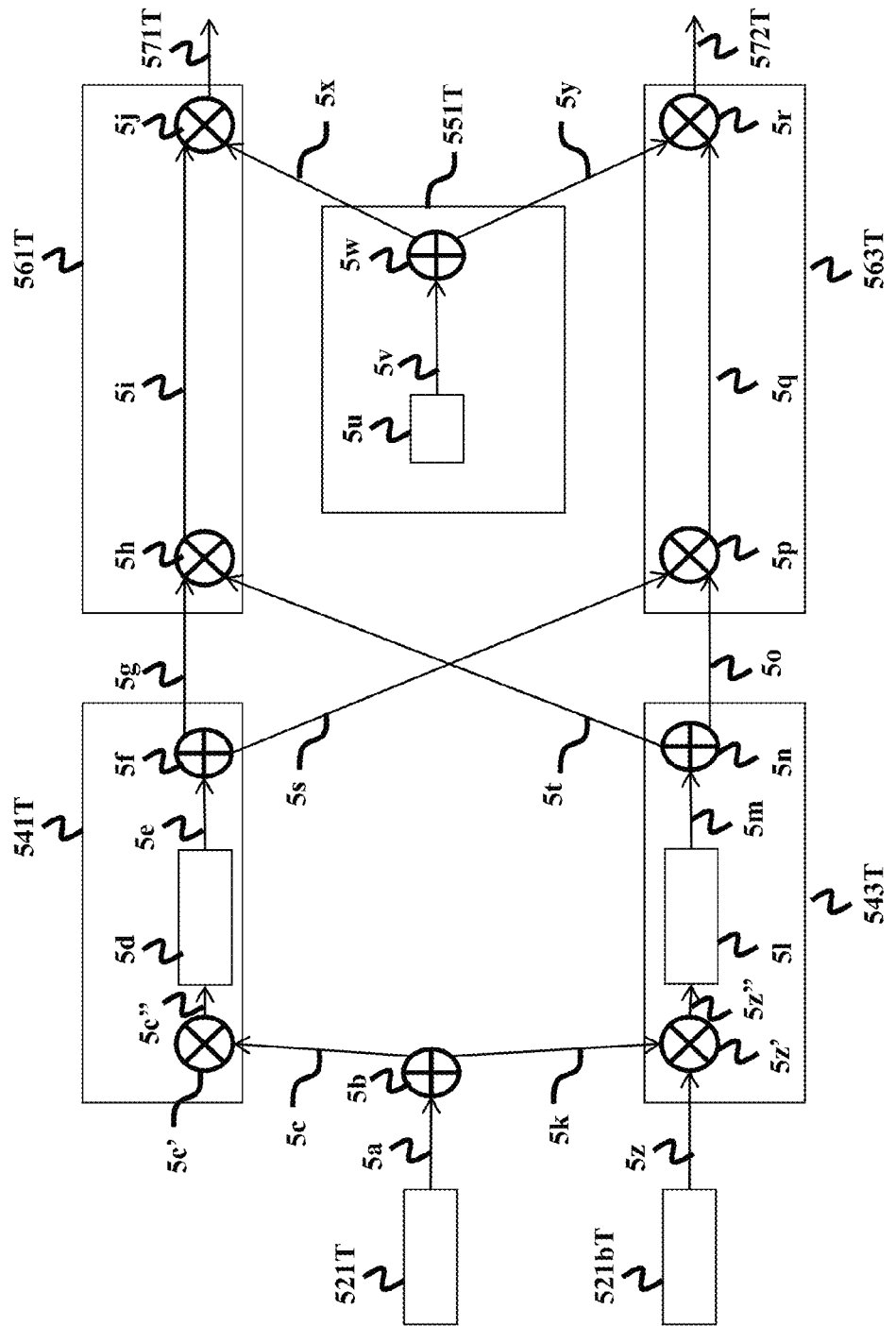
FIG. 5 shows the major functional elements and optical connections associated with the client-to-SP signal direction of a preferred embodiment consistent with the invention.

FIG. 5 depicts the Slave egress direction of optical signal flows in greater detail. In the figure, 3 digit numbers followed by the letter "T" are used to label depicted portions of elements from FIG. 4 whose 2nd and 3rd numeric digits match. Hence, 521T here corresponds to a portion of element 421 of FIG. 4. Elements in FIG. 5 which have a single digit number "5" followed by a letter are used to reference all other depicted items.

Slave portion 521T is connected to Master portion 541T over fiber 5a, through optical splitter 5b, and then fiber 5c, with a similar connection to Master portion 543T over fiber 5a, through optical splitter 5b, and then fiber 5k. Optical splitter 5b may, alternatively, be replaced by an optical switch, although the use of an optical splitter is preferred due to its low probability of failure and the lack of any need to actively monitor and/or control it (e.g. detect the switch state or cause a change in the switch state).

In Master portion 541T, the optical signal(s) from the Slave arrive on fiber 5c at block 5d via optical switch 5c' and fiber 5c", which will be explained in greater detail in FIG. 7. Optical signals from block 5d then transit fiber 5e to optical splitter 5f. Optical splitter 5f distributes the optical signals passing through it to each of the redundant optical switching elements, here to element 561T via fiber 5g, and to element 563T via fiber 5s. Block 5d includes the necessary elements to receive the CCC signal from the Slave. Master portion 543T is identical in structure to Master portion 541T, and connects to fiber 5k at block 5l via optical switch 5z' and fiber 5z", then to fiber 5m to optical splitter 5n which distributes the optical signals in turn to fibers 5o and 5t. Optionally, optical splitters 5f and 5n may each be replaced by an optical switch, however the use of an optical splitter is preferred due to its low probability of failure and the lack of any need to actively monitor and/or control it (e.g. detect the switch state or cause a change in the switch state).

Optical switch element portion 561T receives the optical signal from Master portion 541T on fiber 5g and from Master portion 543T on fiber 5t, and selects which of these two signals to send on fiber 5i using optical switch 5h. The selection corresponds to the system's choice of whether Master portion 541T or Master portion 543T is deemed the "active" member of the redundant equipment group comprised in part of these Master portions. The optical signals traversing fiber 5i are in turn connected to optical switch 5j, which is also connected to transceiver portion 551T via fiber 5x, and to fiber 571T which is the optical route within the SP's network connected to optical switching element portion 561T. Optical switch 5j allows selection of whether the optical data plane signals from one of the Master portions is passed to fiber 571T, or whether the optical signal from transceiver portion 551T is passed to fiber 571T. Optical switch element portion 563T is identical in structure to optical switch element portion 561T, and connects to Master portion 541T via fiber 5s and to Master portion 543T via fiber 5o at optical switch 5p, then to fiber 5q which, along with fiber 5y connected with said transceiver portion 551T connects to optical switch 5r, and then to fiber 572T which is the optical route within the SP's network connected to optical switching element portion 563T. Optical switches 5h and 5j, along with fiber 5i may optionally be realized as a single optical switch, or any other equivalent structure which allows the selection of which of the optical signals on fibers 5g, 5t and 5x are passed to fiber 571T, and the analogous equivalents may, of course, be employed in the structure of optical switching element portion 563T.

Transceiver portion 551T generates an optical signal in transmitter block 5u, which is then connected to optical splitter 5w via fiber 5v, which allows portions of said optical signal to be sent along each of fibers 5x and 5y. Optical coupler 5w may optionally be replaced by an optical switch, however the use of an optical splitter is preferred due to its low probability of failure and the lack of any need to actively monitor and/or control it (e.g. detect the switch state or cause a change in the switch state).

Through control over the switch states of optical switches 5h and 5p, the system is able to choose which of the two Masters the optical data plane signal from the Slave will pass through before being sent towards the SP's network. Such a Master will be termed the "active" member, while the other Master of such a pair will be termed the "standby" member. Through control over the switch states of optical switches 5j and 5r, the system is able to choose whether the optical data plane signal originating from the Slave or the optical signal originating from the transceiver will be passed to each of the two routes, 571T and 572T, within the SP's network connected to the respective optical switching elements. While various switching state combinations are possible, as will be described later, it is typical for one network route to convey the optical data plane signal originating from the Slave, and passing through the active Master, and for the other network route to convey either the optical data plane signal passing through the active Master or the optical signal originating within the transceiver.

FIG. 5 also shows that an extra traffic signal may be supported, such as a signal from Slave 521bT over fiber 5z to switch 5z'. The optical data plane signal from Slave 521bT may be passed through Master portion 543T when said Master portion does not need to be the active member, since optical switch 5z' may select either the optical data plane signal from fiber 5k or the extra traffic signal from fiber 5z. When an extra traffic signal is conveyed over the SP's network, it will be configured to operate with optical properties approximating that of the optical data plane signal conveyed along fiber 5k. This allows the extra traffic signal to be conveyed through the network instead of the optical signal from the transceiver. While it is therefore possible to use the extra traffic signal to provide hot-standby behavior of the redundant path instead of using a transceiver signal for that purpose, it is advantageous for a transceiver to be available as an alternate means of ensuring hot standby functionality in case the extra traffic signal failed. Further, while not shown in FIG. 5, the Slave conveying an extra traffic signal may be connected to not only one of the two Master portions in a redundant group, but to both of said Master portions.

Still further, extra traffic functionality may also be realized by the use of a Slave and either one or a protected pair of Master portions in addition to the Slave and one or protected pair of Master portions supporting the higher priority optical data plane signal which would preempt the extra traffic signal path within the network. The Master portions associated with the extra traffic signals would connect to optical switch elements 561T and 563T via additional instances of one or more fibers equivalent to 5g, 5s, 5t and 5o, and would terminate on additional instances of optical switches equivalent to 5h and 5p. If optical switches 5j and 5r were multi-port switches such as fiber cross connect type devices, and assuming said additional instances of optical switches equivalent to 5h and 5p are connected via respective fibers equivalent to 5i and 5q, the signals passed to the SP's network along fibers 571T and 572T may be chosen, by means of appropriate control of said switches, to convey any possible combination of the optical data plane signal which is not the extra traffic signal, the extra traffic signal, or the optical signal from a transceiver along the respective said fibers.

Figure 6:
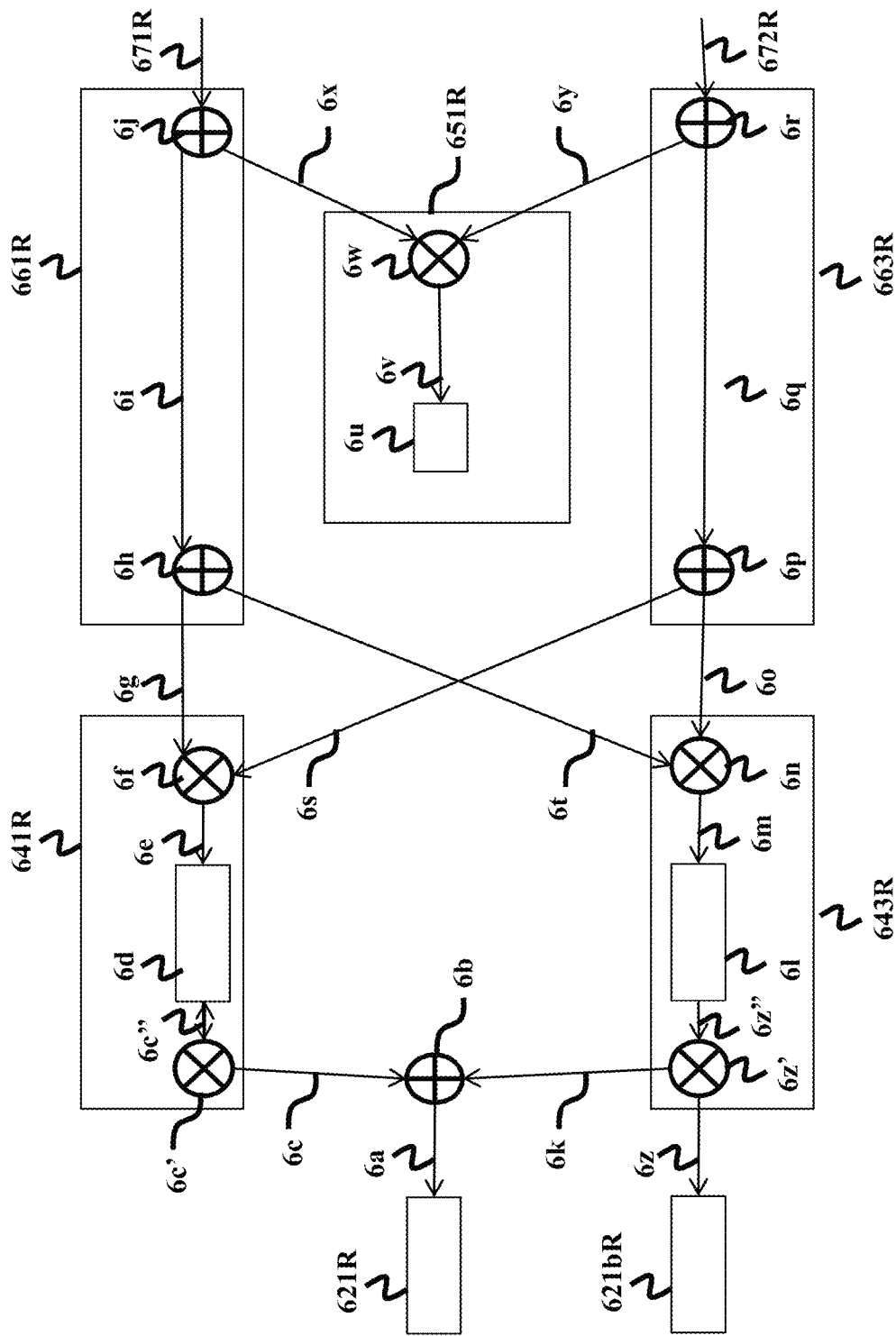
FIG. 6 shows the major functional elements and optical connections associated with the SP-to-client signal direction of a preferred embodiment consistent with the invention.

FIG. 6 depicts the portions of Slave, Master, transceiver and optical switching elements and their interconnections corresponding to the direction of optical signal flow opposite that of FIG. 5, being the direction from the SP's network towards the Slave.

In FIG. 6, the optical signal arriving from the SP's network on route 671R is connected to optical switching element portion 661R at optical splitter 6j. Optical splitter 6j passes a portion of said optical signal via fiber 6x to optical switch 6w in transceiver portion 651R, and a portion of said optical signal via fiber 6i to optical splitter 6h. Optical splitter 6h in turn passes a portion of the optical signal it received on fiber 6i to Master portion 641R via fiber 6g, and a portion of the optical signal it received on fiber 6i to Master portion 643R via fiber 6t. Optical switch element portion 663R has an identical structure to that of 661R, comprised of the SP's network route 672R connecting to optical splitter 6r, which passes portions of the optical signal to each of fibers 6y and 6q, where 6y is connected to transceiver portion 651R and 6q connects to optical splitter 6p, which in turn connects to Master portion 641R via fiber 6s and Master portion 643R via fiber 6o. Optical splitters 6j and 6r may be replaced by optical switches, however the use of an optical splitter is preferred due to its low probability of failure and the lack of any need to actively monitor and/or control it (e.g. detect the switch state or cause a change in the switch state). Optical splitters 6h and 6p may be replaced by optical switches, however the use of an optical splitter is preferred due to its low probability of failure and the lack of any need to actively monitor and/or control it (e.g. detect the switch state or cause a change in the switch state).

Transceiver portion 651R receives an optical signal from optical switching element portion 661R via fiber 6x and an optical signal from optical switching element portion 663R via fiber 6y at optical switch 6w. Optical switch 6w selects one of the received optical signals and passes it via fiber 6v to optical receiver block 6u. When the optical signal passed to optical receiver block 6u is a signal which originated at an optical transceiver portion such as that described as 551T in FIG. 5, the signal may be converted into an electrical equivalent, allowing the information content to be received. In addition, the receiver is able to monitor and measure received signal properties such as optical power level, signal-to-noise ratio, and bit-error rate, by way of non-exhaustive and non-limiting examples. An optical signal conveyed from one optical transceiver to another will be referred to as a hot-standby signal.

Master portion 641R receives an optical signal from optical switching element portion 661R via fiber 6g and an optical signal from optical switching element portion 663R via fiber 6s at optical switch 6f. Optical switch 6f selects one of the two received optical signals and passes the selected optical signal via fiber 6e to block 6d. The selection made at optical switch 6f determines whether the optical signal passed through the optical switch is that from network route 671R or network route 672R. Block 6d includes the CCC transmitter portion of the corresponding Master. Block 6d may also include a mechanism for blocking passage of the optical signal received on fiber 6e. Block 6d is in turn connected to fiber 6c via fiber 6c" and optical switch 6c', then to optical coupler 6b and then to fiber 6a, which connects to Slave portion 621R. Master portion 643R has an identical structure to that of 641R, with fibers 6o from optical switching element portion 661R and 6t from optical switching element portion 663R connected to optical switch 6n, in turn connected via fiber 6m to block 6l, which in turn connects to optical coupler 6b via fiber 6z", optical switch 6z' and fiber 6k. Optical coupler 6b may be replaced by an optical switch, however the use of an optical splitter is preferred due to its low probability of failure and the lack of any need to actively monitor and/or control it (e.g. detect the switch state or cause a change in the switch state). By control of the CCC transmitters and aforementioned blocking mechanism within blocks 6d and 6l and/or by control of 6b if it is an optical switch, the system is able to select whether the optical data plane signal and CCC signal received by Slave portion 621R is that from master portion 641R or 643R, which will typically correspond to the active Master.

FIG. 6 also shows that an extra traffic signal may be supported, such as a signal to Slave 621bR over fiber 6z from switch 6z'. The optical data plane signal to Slave 621bR may be passed through Master portion 643R when said Master portion does not need to be the active member, since optical switch 6n may be used to select the signal from the hot-standby path while optical switch 6z' may select either fiber 6k or fiber 6z. When an extra traffic signal is conveyed over the SP's network, it will be configured to operate with optical properties approximating that of the optical data plane signal conveyed along fiber 6k. This allows the extra traffic signal to be conveyed through the network instead of the optical signal from the transceiver. While it is therefore possible to use the extra traffic signal to provide hot-standby behavior of the redundant path instead of using a transceiver signal for that purpose, it is advantageous for a transceiver to be available as an alternate means of ensuring hot standby functionality in case the extra traffic signal failed. Further, while not shown in FIG. 6, the Slave conveying an extra traffic signal may be connected to not only one of the two Master portions in a redundant group, but to both of said Master portions.

Still further, extra traffic functionality may also be realized by the use of a Slave and either one or a protected pair of Master portions in addition to the Slave and one or protected pair of Master portions supporting the higher priority optical data plane signal which would preempt the extra traffic signal path within the network. The Master portions associated with the extra traffic signals would connect to optical switch elements 661R and 663R via additional instances of one or more fibers equivalent to 6g, 6s, 6t and 6o, terminated on additional instances of optical splitters equivalent to 6h and 6p. Optical splitters 6j and 6r connect to said additional optical splitters equivalent to 6h and 6p, respectively, either through the use of 3 way optical splitter devices, or preferably by connecting fibers 6x and 6y to optical switch devices able to route optical signals either to said additional Master portions or to a transceiver. Such an arrangement is similar to that shown in FIG. 10 and its accompanying description, where the structure is described in the context of supporting multiple transceivers. By appropriate control of the optical switches, the optical signals from network fibers 671R and 672R may be sent to any combination of the Slave supporting the optical data plane signal which is not the extra traffic signal, the Slave supporting the extra traffic signal, or a transceiver.

One skilled in the art may recognize that there are further equivalent structures which may be employed in place of the aforementioned optical switch and optical coupler components. For example, an equivalent structure to optical switch 6f may be formed by connecting the optical input of each of two silicon optical amplifiers (SOAs) to fibers 6g and 6s and the optical outputs of said SOAs to respective inputs of an optical coupler, the output of said optical coupler connected in turn to fiber 6e. By selectively controlling said SOAs so that only one of them allows a signal to pass, an equivalent structure to optical switch 6f is realized. The examples explained by way of the figures are meant to be illustrative in nature and not limitations.

Figure 7:
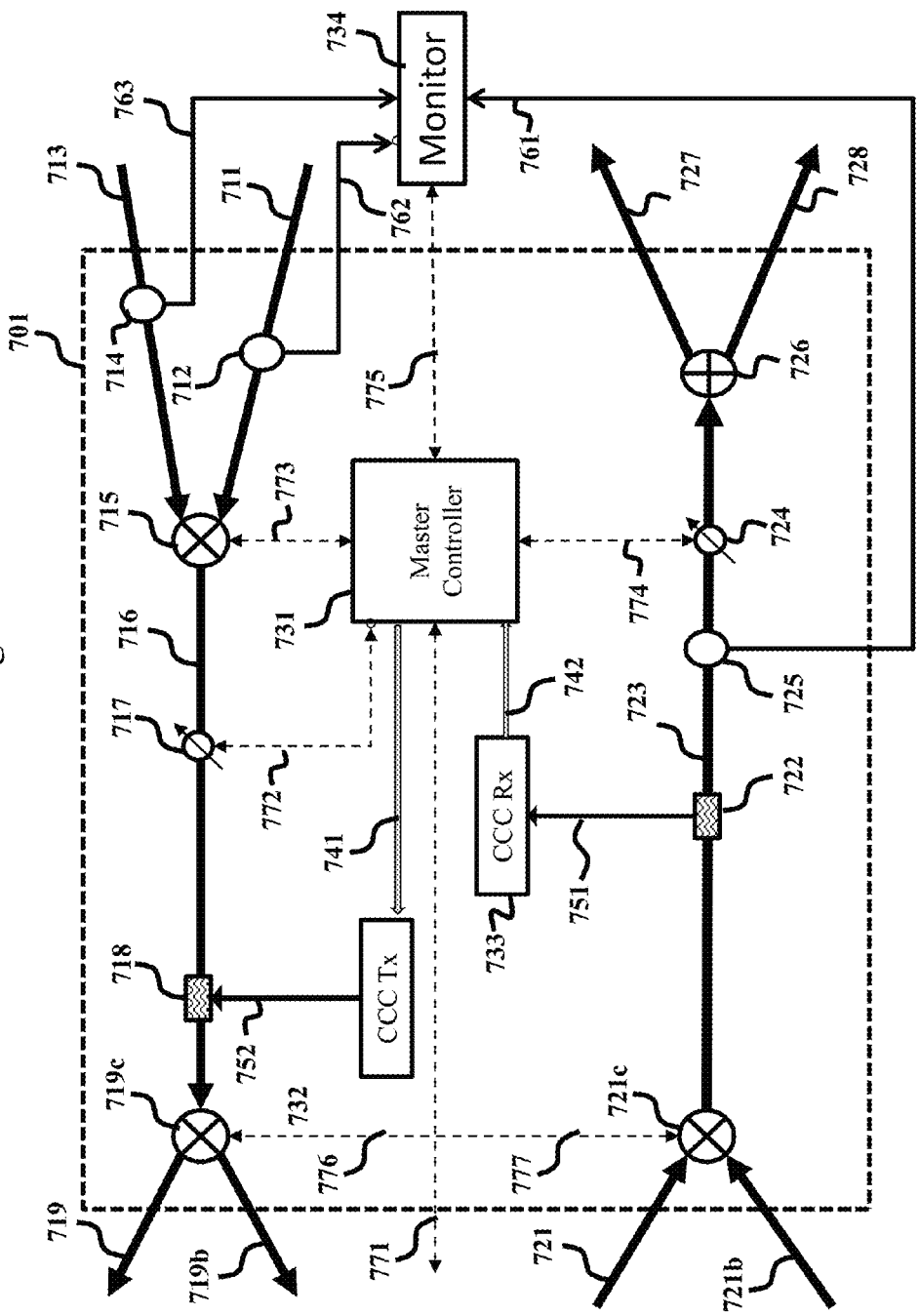
FIG. 7 shows the structural elements, relationships and main signal flows of a preferred embodiment of a Master equipment apparatus consistent with the inventive proposal.

A still more detailed description of the structure of an enhanced Master consistent with the claimed invention is shown in FIG. 7, where both directions of optical data plane signal flow are shown. A Slave would be connected via fibers 719 and 721, which may, for example, correspond to fibers 5c of FIGS. 5 and 6c of FIG. 6 assuming the enhanced Master corresponded to portions 541T of FIGS. 5 and 641R of FIG. 6. Master controller 731 is shown to control optical shutters 717 and 724 via control paths 772 and 774 respectively, said shutters providing the means to block the passage of respective optical signals. These optical shutters may alternatively be realized by the use of variable optical attenuators or other equivalent means.

In FIG. 7, the example shown utilizes a separate optical wavelength for conveying the CCC. Master controller 731 sends CCC information via electrical path 741 to CCC transmitter 732, which originates the CCC optical signal sent to optical filter 718 via fiber 752. Master controller 731 also receives CCC information via electrical path 742 from CCC receiver 733, which receives the CCC optical signal from optical filter 722 via fiber 751. Since shutter 717 is located upstream of filter 718 along fiber 716, the CCC transmitter 732 may be controlled in a co-ordinated manner to either allow the CCC and the optical data plane signal to pass, to allow only one of these two signals to pass, or to prevent both signals from passing. Alternatively, filter 718 may be located upstream of shutter 717, in which case shutter 717 is able to simultaneously control the passage of both an optical data plane signal arriving along fiber 716 and the CCC optical signal towards the Slave. Filter 722 being prior to shutter 724 allows reception of the CCC signal from the Slave even while the optical data plane signal is blocked from entry into the rest of the SP's network.

Optical switch 715 is controlled by Master controller 731 via control path 773 to select between optical fibers 711 and 713, corresponding to the two drop connections (SP to Slave direction optical signal flows) from two optical switching elements, which in turn correspond to one of the two network routes as explained in the description of FIG. 6. In the opposite direction of optical data plane signal flow, splitter 726 connects to the two optical switching elements via fibers 727 and 728, corresponding to fibers 5g and 5s or fibers 5o and 5t as explained in the description of FIG. 5.

Optional optical taps 712, 714 and 725 provide an optical signal monitoring capability through the use of an optional optical signal monitor 734, such as an Optical Spectrum Analyzer, connected via fibers 762, 763 and 761 respectively. Taps 712, 714 and 725 couple a small portion of the optical signal energy to the monitor, typically being devices such as those with a 99/1 or 99/5 splitting ratio, but any splitting ratio is consistent with the invention. Tap 725, shown between filter 722 and shutter 724 may also be located prior to 722, between 724 and 726, along fibers 727 and 728 or a combination of these points may be used. Taps may also be located between switch 715 and shutter 717, between filter 718 and shutter 717, after filter 718 or a combination of points may be used. The monitor may also optionally be connected to the Master controller 731 through control path 775 to allow Master controller 731 to obtain information on the optical signal parameters on the various connected routes, such as, by way of non-exhaustive example, optical signal to noise ratio, optical power levels, and optical spectrum occupancy.

By control of optical switch 719c via control path 776, the Master is able to select to which of fiber paths 719 and 719b the signal(s) conveyed towards the Slave will travel, allowing the Master to select between two different Slaves (not shown). In the opposite direction, signal(s) from two different Slaves (not shown) arrive along fiber paths 721 and 721b and optical switch 721c, controlled via control path 777, allows selection of which is conveyed to the Master. Optical switch 719c corresponds to optical switches 5c' and 5z' of FIG. 5, while optical switch 721c corresponds to optical switches 6c' and 6z' of FIG. 6. Said optical switches allow one Master to selectively communicate with and control either of two Slaves. As explained in the descriptions of FIG. 5 and FIG. 6, this enables the inventive system to support extra traffic via such a Master, as one Master of a pair may choose to convey signals to and from one Slave, while the other Master may choose to convey signals to that same Slave when providing protection functions for that path, or to a different Slave when conveying extra traffic signals of said different Slave. Optical switches 719c and 721c are optional—if it is not desired that a Master provide extra traffic support in the manner described, fiber 719 may connect directly to filter 718 while fiber 721 may connect directly to filter 722, and control paths 776 and 777 are not needed.

Figure 8:
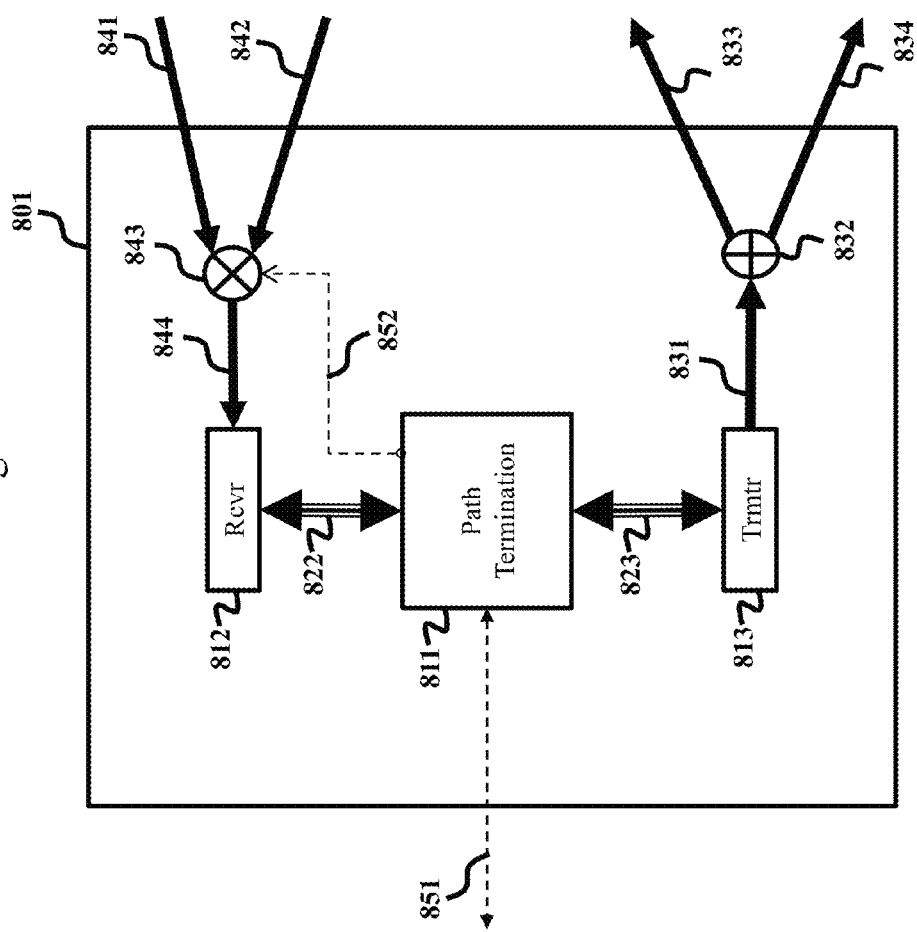
FIG. 8 shows the structural elements, relationships and main signal flows of a preferred embodiment of a hot-standby transceiver equipment apparatus consistent with the inventive proposal.

FIG. 8 depicts a preferred embodiment of a transceiver 801 consistent with the invention. Path termination block 811 translates information exchanged with other system elements via information path 851 between the format of the signal sent via transmitter 813 and received by receiver 812. An example is that path termination block 811 translates between memory mapped data structure managed via information path 851 and a SONET STS-3 signal format exchanged over paths 822 and 823. The use of a signal such as a SONET STS-3 format signal allows transceivers at opposite ends of a link to perform end-to-end connection verification via path tracing, signal quality measurements such as bit error rate monitoring, quality threshold level violation detection when error rates exceed preset levels, and detection of failure events such as loss of frame or loss of signal. In addition, the use of a relatively low rate signal such as STS-3 minimizes component costs and provides improved optical transmission margins. The optical signal from transmitter 813 is sent via fiber 831 to splitter 832 which couples the optical signal to each of two optical switching elements (not shown) via fibers 833 and 834. Optical signals from each of the two optical switching elements arrive via fibers 841 and 842 at optical switch 843, which is controlled via control path 852 to select which optical signal is connected through the switch to receiver 812 via fiber 844. Transmitter 813 and receiver 812 convert between optical and electrical signal formats. Transmitter 813 must be operable to provide an optical output signal with characteristics approximating those of the optical data plane signal sent by the Slave with which the transceiver will be associated through the arrangement of the transceiver optical signal being utilized for providing the hot-standby route within the SP's network.

While path termination block 811 is shown as a component within transceiver 801, this is merely a preferred embodiment. Path termination block 811 may alternatively be implemented as a centralized function with one or more instances of connections 822, 823 and 852, or it may be implemented partially in a centralized manner and partially in a distributed manner. All such variations are considered equivalent structures and thus within the scope of the claimed invention. Further, control path 851 allows control communication between transceiver 801 and other elements of the overall system, including by way of non-limiting examples, communication with Masters via their control path 771 as shown in FIG. 7, an equivalent control path of optical switch element portions such as 561T and 563T of FIG. 5, 661R and 663R of FIG. 6, 961T and 963T of FIGS. 9, and 1061R and 1063R of FIG. 10, or a Network Element controller or management system such as an EMS or NMS.

Three distinct types of protection functionality are provided in the disclosed structures, and each will now be explained with reference to the various figures. Although not explicitly depicted in the drawings, it is assumed that at each optical switch input port depicted in the drawings there is an optical power detection function sufficient to detect whether or not there is an optical signal present at a power level which is within the engineered operating range for signals which are expected to pass through that point.

In the case of the Master equipment, the structure is operable to allow correct operation in the event either one of the two Master equipment units fails while the other does not, or in the event that one of the two optical routes between the Slave and the redundant Master units fails. Two Master units within the same node optically connected to the same Slave will hereafter be referred to as members of a Master redundancy group or as members of a Master protection group. Failure of any one or more components within a Master may be determined using conventional means well known to those skilled in the art, and in the event a Master is deemed to have suffered a component failure, the other Master member within the Master protection group may be selected as the active member while the failed unit is reported to the SP's management system to initiate corrective actions. Operation of a Master protection group will now be further described by reference to FIGS. 5, 6 and 7.

Referring to FIG. 5, the signals (CCC and optical data plane signal) sent from Slave portion 521T travel to both Master portion 541T and Master portion 543T. As shown in greater detail in FIG. 7, each of these Master portions will contain both a CCC receiver 733 and an optical monitoring tap 725. As the signal from the Slave is sent to both Masters by means of splitter 5b of FIG. 5 and the associated fibers 5a, 5c and 5k, each of the Masters may determine whether the fiber route from the Slave to a Master is operable, since each Master will receive a copy of the signals. If one of the Masters receives the signals while the other does not, the optical route between splitter 5b and the Master which does not receive the signals is known to be inoperable, and system operation is therefore adjusted so that the optical data plane signal is set to pass through the Master which successfully receives the signals. This is arranged by controlling shutters 724 depicted in FIG. 7 in each Master so that these shutters are open in the Master which receives the signals and closed in the other Master. Further, optical switches 5h and 5p in the optical switching elements 561T and 563T of FIG. 5 are set to pass the signals from the Master whose shutter 724 is open. If both Masters successfully receive the signals, either Master may be selected as the one through which the optical data plane signal would be passed. Note, however, that the optical data plane signal may or may not be passed by the selected Master, since it will only be allowed to pass if it conforms to the optical signal characteristics deemed acceptable by the SP. Such characteristics may be determined through analysis of the optical signal properties as indicated by the Slave via the CCC, by measurements obtained through the use of the Monitor 734 depicted in FIG. 7, or through a combination of these.

Further, if either Master is eligible to be that through which the optical data plane signal may be passed, the choice of which Master will actually be the one selected may be made based upon criteria such as choosing the same Master as will be used for the opposite direction of signal flow, or a system defined method such as a provisioned default or an elected choice determined by an election algorithm.

In the opposite direction of signal flow, only the route from the currently active Master will be monitored for failure, since signals on the other route will be blocked by means of the closed shutter 717 and control of CCC transmitter 732 as shown in FIG. 7. This is because only one of the two Masters may send signals to the Slave, otherwise interference may occur between the signals on the two routes. The integrity of the CCC signal sent to the Slave by whichever Master is selected for this direction of operation is monitored by having the Slave send an indication via the CCC to the Masters of whether or not the CCC receiver at the Slave receives the CCC signal. This is analogous to the Remote Defect Indication functionality defined in several telecommunications signal specifications, such as those for DS1, DS3, SONET, SDH and OTN signal types. The CCC may also be used to send, from the Slave to the Masters, an indication of whether the optical data plane signal is being received at the Slave. If none of the optical signals sent from the selected Master to the Slave are received by the Slave, the optical route from the selected Master to the Slave may be compromised, while if at least one of the two optical signals is received by the Slave, the optical route is known to be operable. In the event that failure of the optical route is suspected, the selection of the Master may be changed so that the other Master becomes the selected one supporting the Master to Slave direction. In the event that the failure condition persists, it is likely that either the fiber 6a or coupler 6b are failed or disconnected, or that both fiber 6c and 6k are failed or disconnected, or some combination thereof, and the selection of the Masters in this direction may alternate periodically in order to ensure monitoring of both optical routes between the Masters and the Slave in order to detect recovery of either route. Any failure conditions detected may also be reported to the SPs management system to initiate further analysis and possible corrective actions.

Figure 9:
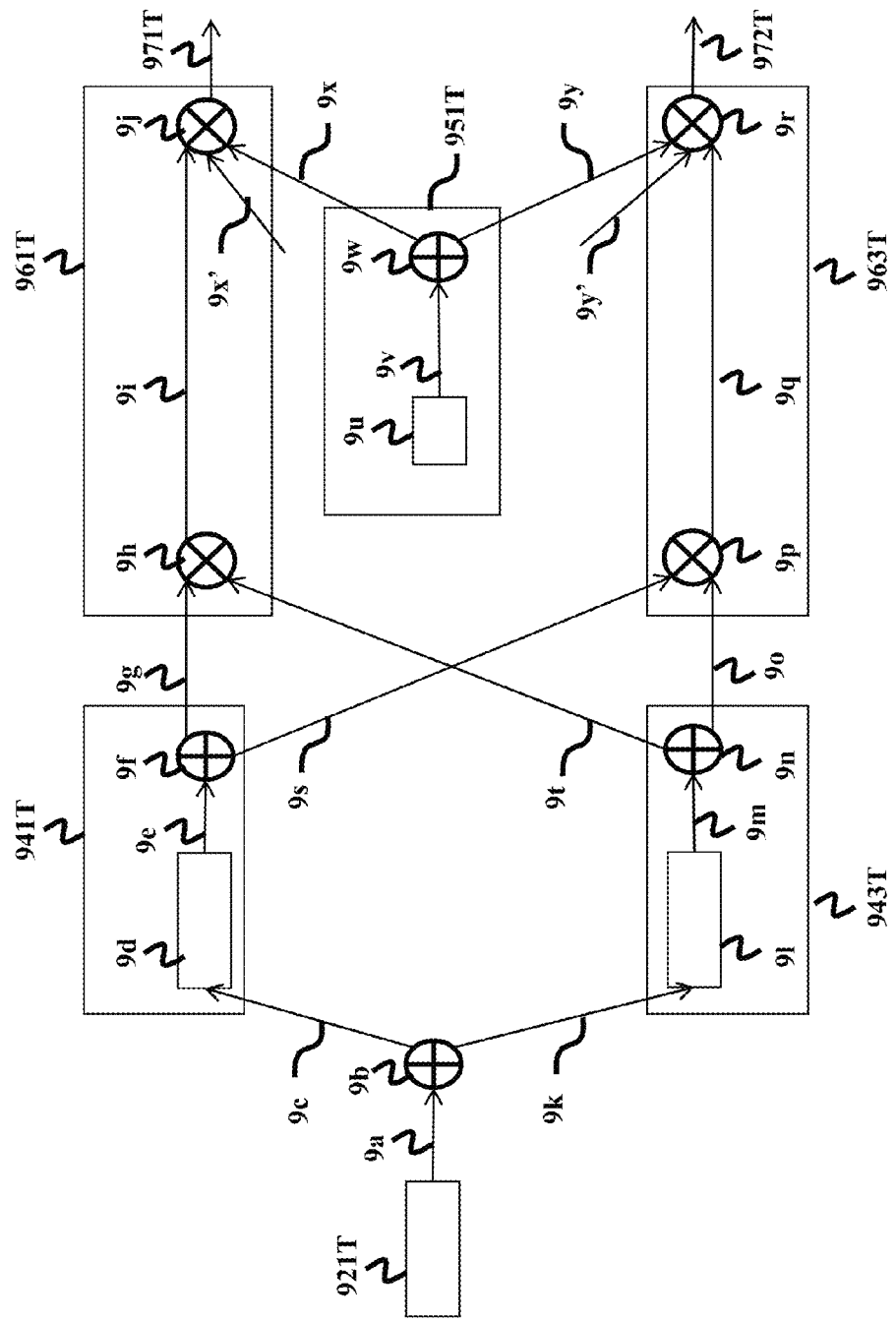
FIG. 9 shows the major functional elements and optical connections associated with the client-to-SP signal direction of a preferred embodiment which incorporates transceiver equipment protection consistent with the invention.

Equipment redundancy may also optionally be provided for the transceivers. FIG. 9 shows a structure similar to that depicted in FIG. 5, with optical fibers 9x' and 9y' as inputs to switches 9j and 9r, representing connections to one or more additional transceiver portions. When switches 9j and 9r are implemented as a multi-port structure, such as a fiber cross connect, it enables any one of the transceiver portions connected to an input of a switch to be connected to an output of said switch, and for there to be multiple outputs similar to 971T and 972T (such additional outputs are not shown in the figure) from each of said switches. By the addition of suitable control logic governing operation of a switch, and the use of two or more transceiver portions, it is possible to select an alternate transceiver portion to be used in place of that of a failed transceiver portion, and for one or more equipment protection groups to be formed, each of which operates as an M:N group, where each group is associated with one of the possible outputs.

Figure 10:
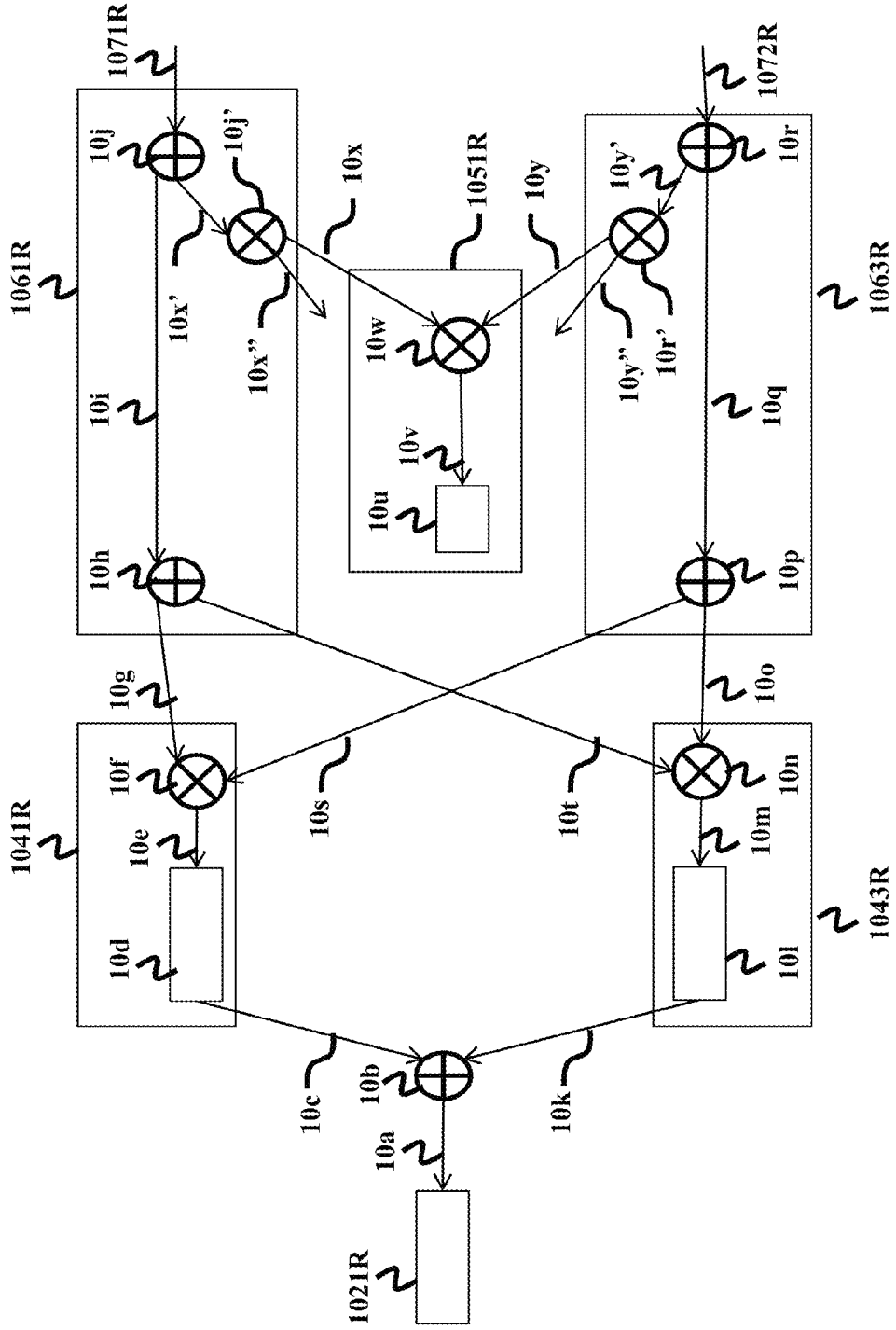
FIG. 10 shows the major functional elements and optical connections associated with the SP-to-client signal direction of a preferred embodiment which incorporate transceiver equipment protection consistent with the invention.

The corresponding enhancements for the opposite direction of signal flow are depicted in FIG. 10, which shows an enhanced structure similar to that of FIG. 6. In FIG. 10, outputs of couplers 10j and 10r providing a copy of an optical input signal towards a transceiver are each modified from a fiber connecting the coupler to a switch input of a transceiver portion, to a structure wherein the coupler is first connected to an input of an optical switch, and outputs of said optical switch are in turn connected to two or more transceiver portions. With reference to FIG. 10, coupler 10j is connected to the input of optical switch 10j' via fiber 10x', and switch 10j' is in turn connected to two or more transceiver portions, as represented by fibers 10x'' and 10x. Coupler 10r is likewise connected to the input of optical switch 10r' via fiber 10y', and switch 10r' is connected to two or more transceiver portions via fibers 10y and 10y'''. Switches 10j' and 10r' allow the optical signal from respective couplers 10j and 10r to be connected to any of the connected transceiver portions. If switches 10j' and 10r' are implemented as multi-port switches such as a fiber cross connect, the structure allows the signals from any number of couplers to be interconnected in any manner to the transceiver portions. By using such A×B cross connecting switches in these positions, and in positions 9j and 9r of FIG. 9, a collection of 2 or more transceivers may be managed as one or more equipment protection groups, each of which operates in an M:N manner, where M transceivers act as backups for N others. By arranging these groups to align with input fibers and transceiver portions in the same combinations as the corresponding opposite direction elements depicted in FIG. 9, such M:N protection groups may provide protection services for bi-directional signal flows of the associated transceivers.

In the case of routes within the SP's network, redundancy is possible via the alternate routes depicted by way of example as 471 and 472 in FIG. 4. In the following description of route redundancy or protection functions, route 471 of FIG. 4 will equate to 571T of FIGS. 5 and 671R of FIG. 6, while route 472 of FIG. 4 will equate to 571T of FIGS. 5 and 672R of FIG. 6, as a means of explaining the correspondence of elements of these figures. Further, for the purpose of illustration and not of limitation, the description will assume that route 471 of FIG. 4 is regarded as the normally working route, while route 472 is regarded as the standby or redundant route.

When an APS channel is needed, said channel may be conveyed along one or more of three possible protection switching control paths able to convey protection switching control information between the service edge nodes of the SP's network which contain the Master(s) selected for passage of at least one direction of the optical data plane signal. The three possible protection switching control paths are (a) a path using an out-of-band approach, such as the SP's data communication network, represented in FIG. 4 as control path 481; (b) a path which traverses at least a standby route, and which transports protection switching control information via overhead within the optical data plane signal added by the Slave, such as OTN overhead, or via the optical signals exchanged between the transceivers, whichever signal is traversing the standby route; or (c) a path conveyed via the optical signals exchanged between the transceivers, regardless of which route or routes those optical signals traverse.

One protection scheme is based upon the M:N protection model previously applied to transmission systems such as those based upon the DS-n, SONET, SDH or OTN specifications and standards. In an M:N protection scheme, M standby routes are provided on a shared usage basis as a means of providing redundancy for the failure of up to M of the N working routes. If there are multiple working routes which fail simultaneously, the scheme is able to provide redundancy for signals on up to M of the failed routes—the signals on the other failed routes experience a loss of service. When a standby route is not needed for protection of one of the working routes, it may be left idle or it may be used to carry an alternate signal, typically referred to as an "extra traffic" signal. Such "extra traffic" signals would typically be used for lower priority revenue generating services which do not have a service availability guarantee.

With reference to FIG. 5, when the optical data plane signal path within the SP's network employs the normally working route, at least switches 5h and 5j will be set to allow the signal from the selected Master to pass towards the SP's network. In addition, switch 5p may also be set to allow the signal from the selected Master to pass towards the SP's network. Switch 5r, however, may be set to allow the signal from transceiver portion 551T to pass to fiber 572T, so that the transceiver signal may traverse the SP's network to the transceiver at the far end of that path. Should the optical data plane signal not be present for some reason, it is advantageous for this information to be conveyed via the hot-standby facility optical signal (the optical signal sent between the transceivers), since this may allow the far end node to more accurately determine whether the route between the edge nodes of the SP's network transporting the optical data plane signal has failed or whether that route may still be intact but the optical data plane signal has itself failed. Such information may also be conveyed via other means, such as a control path.

In the case where extra traffic functionality is supported, switch 5r may instead select a signal from a different Master (not shown) for transmission over the redundant route. Switches 5j and 5r may, for example, offer such capability if they support more than 2 inputs, such as will be the case if these switches are realized as multi-port fiber cross connects. Since it is advantageous to know the status of the redundant route before any attempt is made to switch an optical data plane signal onto that route, it is desirable to have at least one of an extra traffic signal or a transceiver hot-standby signal switched to the redundant route while the optical data plane signal is not using the redundant route.

With reference to FIG. 6, the normally working route will by way of example be mapped to 671R, and while the optical data plane signal is conveyed over that route, said optical data plane signal will pass through couplers 6j and 6h to the redundant Master portions 641R and 643R via fibers 6g and 6t respectively, thence through switches 6f and 6n to fibers 6e and 6m respectively. The Master portion selected to provide the optical data plane signal towards Slave portion 621R will be arranged to allow the optical data plane signal to pass through while the other Master portion shall block the passage of the optical data plane signal copy passing there through. Assuming each Master has the structure explained in greater detail in FIG. 7, control of this direction of flow of the optical data plane signal is achieved via control of blocking device 717 by Master controller 731 via control path 772.

Either an extra traffic signal or a signal originating from the far end transceiver may arrive on the redundant route along fiber 672R. In the event that extra traffic functionality is not supported, couplers 6j and 6r may connect to the transceiver portion 651R via fibers 6x and 6y, respectively. If extra traffic functionality is to be supported, couplers 6j and 6r may each connect to respective optical switches, able to route signals to either fibers connecting to transceiver portions or those connecting to Master portions (not shown in the figures). Such optical switches may be combined in such a manner that switches 6h and 6p each become a multi-port switch, such as a fiber cross connect, interposed between couplers 6j and 6r, respectively, and corresponding Master portions and transceiver portions. Alternatively, these optical switches may also be realized using couplers which possess more than two outgoing ports, although the increased optical losses of such an alternative may necessitate the addition of further elements, such as one or more optical amplifiers, along one or more portions of the optical paths.

Protection functions of the inventive structure differ in some key aspects from those of prior art systems. In prior art systems such as those described in the SONET and OTN series of recommendations from various organizations such as the American National Standards Institute (ANSI) and the International Telecommunication Union (ITU), there are 2 categories of linear protection defined, namely 1+1 ("one plus one") and M:N ("m for n"). Both of these may be further characterized by whether they operate in a unidirectional or bidirectional manner. In the case of 1+1 unidirectional, the use of an Automatic Protection Switching (APS) protocol and an APS channel over which protocol elements may be exchanged is optional. Systems which employ 1+1 bidirectional schemes, and those systems which provide M:N (including 1:N and 1:1) protection require an APS protocol and an associated APS channel.

In prior art cases, the APS channel is typically transported, at least in part, using overhead data within the protection facilities. This ensures that APS protocol elements may be successfully exchanged via the APS channel whenever the associated protection facilities are not failed, that required protocol elements may be exchanged in real time, and also ensures that the APS channel remains available during the entire protection switching process, with the exception of when said facility is failed. The special case of the protection facility failing is handled by treating such failure as a high priority request within the APS protocol which bars any protecting use of the protection facility, obviating the need for further APS protocol exchange over the failed APS channel. Prior art APS architectures also require the ability to bridge the traffic constituting the payload (information content) transported over the working facility so that it is sent simultaneously over the protection facility at key points during the protection switching process. Most prior art systems also arrange that the point at which an APS related route decision is made coincides with points at which the portions of signals used to monitor and optionally control the protection switching functions associated with that route originate and/or terminate. For example, in a SONET line protection system, the protection switching functions will coincide with points at which the line layer is originated and terminated (i.e. at Line Terminating Equipment).

The inventive system does not require an APS channel to be transported over a particular protection facility using overhead, nor that the 1+1 bidirectional or M:N equivalent cases bridge an optical data plane signal so that it is sent towards both the working and redundant routes simultaneously. Further, the inventive scheme does not require that the point at which an APS related route decision is made coincides with points at which portions of signals used to monitor and optionally control the protection switching functions associated with that route originate and/or terminate.

As noted earlier, the APS channel may be transported via an out-of-band control channel, such as via the Data Communication Network (DCN) linking the edge nodes, via the payload or overhead data of at least whichever facility is traversing a redundant route, or via the payload or overhead of the hot-standby transceiver signal, regardless of whether that signal is traversing the normally working or the redundant route. When the APS channel is transported through means other than an out-of-band control channel, the APS protocol may rely, at certain points, on the loss of reception of the APS channel at an edge node representing a particular event.

When an out-of-band control channel is employed, such as a channel transported within the DCN, the latency and the delay variation for information exchanged via the channel may have an adverse effect upon the speed of protection switching operations. In prior art architectures, exchanges of APS protocol information with real-time transfer requirements is performed via the APS channel transported over a dedicated portion of the protection facility. By using a dedicated channel, such as the K1 and K2 bytes in the case of SONET and SDH systems, as an example, real-time information transfer with latency comparable to that of the data plane signal path is assured. When using an out-of-band channel of the invention, it is preferable to ensure that the latency and delay variation of the APS channel have similar characteristics to that of the prior art approach. This may be achieved via a number of methods well known to those skilled in the art for the operation of channels with known performance bounds, such as, by way of non-exhaustive examples, the use of high-priority virtual connections between the APS control functions at the corresponding service edge nodes, or by the creation of dedicated paths comprised of one or more channel connections linking said APS control functions.

When the inventive system is configured to provide the equivalent of M:N type protection switching, it is generally not possible, nor is it required, that the optical data plane signal be bridged during the protection switching process. The system employs a bi-directional model in which the receive route for the optical data plane signal is always the same as that of the transmit route. The optical data plane signal is temporarily blocked at the point the signal arrives from a Slave to its associated Master, the optical data plane signal wavelength assignment is modified to conform to that of the route to which it is being switched, the aforementioned blocking of the signal is removed, and route assignments of the optical data plane signal and the transceiver's transmitted signal are exchanged. The drop direction of the optical data plane signal path is also blocked whenever a protection switching operation changing the route assignment begins, to ensure that no misconnection of a signal to the Slave will occur at any time during the switching process. A transceiver receive route may, however, differ for periods of time during the switching process from the route used by the transmit direction of said transceiver. When the route assignments of the transceiver transmit path and the optical data plane signal are exchanged, the receive route of the transceiver will not be simultaneously changed. Instead, the transceiver will continue to monitor the currently assigned route until a loss of the APS channel in the receive direction is detected. When the APS channel is lost, but the route is lit, the protection switching system of the invention knows that the far end has successfully switched its optical data plane signal to that route. At that point, the receive route of the transceiver is switched to use the same route as the transceiver transmit direction, and the optical data plane signal path to the Slave is unblocked, completing the switching process. Note that since the destination path is the one which must always maintain continuity, since it is the target destination for the optical data plane signal, it is acceptable to incur the brief interruption of optical data plane signal path which occurs during the wavelength adjustment process; the adjustment period is preferably minimized, and in any case may be achieved using currently available commercial tunable optical transmission components within approximately 20 to 30 milliseconds, which is within the conventionally accepted service interruption time experienced during protection switching operations. The inventive process ensures that the target destination route is always provided with a transmitted optical signal—either that of a transceiver or the optical data plane signal—which thereby ensures that the SP's network is provided with a sufficiently consistent optical signal to avoid adjustments of optical elements along the target destination route.

The protection switching process must also differentiate between optical data plane signal path failures due to the SP's network route assigned to transport the signal versus failures which occur at other points, such as at the Slave, between the Slave and the Master(s), or between the Master(s) and the optical switching element(s). Any single failure affecting the path at points other than the network routes are detected, and in some cases protected. For example, as described earlier, certain failures may be protected by means of the inventive Master equipment protection switching. To enable the APS protocol to distinguish various cases of failures and their locations correctly, and to suppress route switching when the optical data plane signal path could not be protected by such switching, the following indications are passed between the protection switching functions at the associated edge nodes: an indication of optical data plane signal failure when the optical data plane signal itself is deemed to have failed, such as when the selected Master determines its associated Slave has failed or that all routes between Masters and their associated Slave have failed; an indication of when the route selected by the transceiver's receiver has failed should be transmitted towards the far end transceiver, analogous to the DS-n RAI signal or the RDI indication of SONET, said indication being sent within the transmitted signal of the transceiver which detected the fault at its receiver and/or via the APS channel. Whenever the selected Master deliberately blocks the optical data plane signal path towards an associated Slave, it is also advantageous for the selected Master to send to that Slave, via the CCC, an indication that the optical data plane signal path is being intentionally blocked.

During the protection switching process, an APS protocol exchanges information via an APS channel. The protocol conveys the priority level of the switching request condition, including reverse requests as acknowledgments and time based request conditions such as wait-to-restore if configured for revertive switching operation. The protocol and its defined set of request priorities is similar to that defined by prior art schemes such as the SONET protection model. The APS channel, however, is not constrained to be conveyed via the redundant route, and so, their states may not correspond in the same manner as prior art systems. Failure of each route must be determined based upon the status of the signal assigned to that route at any point in time. For example, when the optical data plane signal is assigned to the redundant route and the transceiver channel is assigned to the normally working route, the status of the normally working route will be determined using the transceiver signals while the status of the redundant route will be determined from the status of the optical data plane signal. If the transceiver signal is used to convey the APS channel, the APS channel may thus be failed while the optical data plane signal is switched to the redundant route, if the normally working route is failed.

A protection scheme based upon the 1+1 protection model known to those skilled in the art may also be achieved without the need for a transceiver. If optical switches 5*j* and 5*r* depicted in FIG. 5. are set to pass the signals from fibers 5*i* and 5*q* respectively, the optical data plane signal of the selected Master, connected via switches 5*h* and 5*p* to fibers 5*i* and 5*q*, respectively, will be passed along both routes of the SP's network. Unidirectional 1+1 protection switching behavior may then be realized according to the conventional model, without the need for an APS channel, simply by causing switches 6*f* and 6*n* depicted in FIG. 5 to select the appropriate route based upon the detected optical signal presence status at the respective switch inputs. This example requires that the optical data plane signal characteristics be identical on each of the routes, since the signal from a single optical source within a Slave at one end will be broadcast along both routes to the opposite end. Bidirectional 1+1 protection switching behavior may likewise be achieved, with the same limitation on the optical signal characteristics being the same on both routes in a given direction, by employing an out-of-band APS channel or by conveying the APS protocol via overhead added within the originating Slave and terminated within the receiving Slave, such as via OTN overhead bytes. The APS protocol values exchanged via either of these channels are controlled by the APS protocol state machine executing at the respective edge nodes. When the APS protocol is exchanged via overhead bytes through the use of the Slaves, the CCC between the Slaves and their corresponding Masters are used to convey the APS protocol elements there between.

The 1+1 schemes may also allow the optical signal characteristics of the normally working route to differ, at least in terms of wavelength, from that of the redundant route by employing an optical wavelength converter along the path when following the redundant route. By way of example, if a wavelength converter is placed inline along fibers 5*s* and 5*o*, or inline along fiber 5*q*, or at switch 5*r* or inline along fiber 572T, said locations being those as depicted within FIG. 5, the optical data plane signal along the redundant route would employ the converted wavelength while the normally working route would employ the original wavelength emitted by Slave portion 521T. Were it necessary to restore the original wavelength properties to the signal prior to it reaching Slave receiver 621R as depicted in FIG. 6, additional wavelength conversion may be accomplished by a further optical wavelength converter inline along fiber 672R, at coupler 6*r*, inline along fiber 6*q*, at coupler 6*p*, or inline along fibers 6*s* and 6*o*.

Those skilled in the art will appreciate that various changes and modifications may be made to the embodiments without departing from the spirit or scope of the invention. For example, Master equipment protection may operate in either a unidirectional or bi-directional manner, the number of Master portions allocated to one direction of signal flow may differ from the number of Master portion allocated to the opposite direction of signal flow, provisions for extra traffic operation may be included or omitted, or transceivers may be omitted, all of which are merely variations within the scope of the claimed invention. It is intended that such changes and modifications be included within the scope of the invention. Further, it is intended that the invention not be limited to the embodiments described herein, nor to those changes and modifications apparent as of the filing date of this application.

We claim:

1. In an optical network connecting a customer's network element within a customer's network with a service provider's network element in a service provider's network, a system for providing optical demarcation, comprising:
   a customer interface within said customer's network element,
   a provider interface within said service provider's network element optically coupled to said customer interface, said customer interface for optically conveying a first one or more optical data plane signals to said first provider interface,
   a provider controller within said service provider's network,
   a customer controller within said customer's network element coupled to said provider controller, wherein said customer controller and said provider controller are managed within said service provider's network, and wherein said customer's network element is managed at least in part, but not entirely, within said customer's network,
   a customer demarcation control channel for conveying, between said customer controller and said provider controller, information of at least one optical signal parameter associated with said first one or more optical data plane signals, and wherein said provider controller is configured to enable and to prohibit the transmission of said first one or more optical data plane signals in accordance with said information, and wherein said customer demarcation control channel is not demodulated with said first one or more optical data plane signals at said provider controller, and
   at least one of:
   a first optical waveguide with one of one or more inputs optically coupled to said customer interface and with at least one of two or more outputs optically coupled to said provider interface, or
   a second optical waveguide with one of one or more inputs optically coupled to said provider interface and with at least one of two or more outputs optically coupled to said service provider's network, or
   a first protection switch with one of one or more outputs coupled to said service provider's network and with at least one of two or more inputs optically coupled to either said at least one of two or more outputs of said second optical waveguide, or to said provider interface if said second optical waveguide is not present, each for conveying said one or more optical data plane signals.

2. The system of claim 1 wherein said first optical waveguide is one of either an optical splitter, or an optical selector further coupled to said provider controller.

3. The system of claim 1 wherein said second optical waveguide is one of either an optical splitter, or an optical selector further coupled to said provider controller.

4. The system of claim 1 wherein a second one or more optical data plane signals are optically coupled from said service provider's network to said customer interface.

5. The system of claim 4 further comprising:
a third optical waveguide with one of one or more outputs optically coupled to said customer interface and with at least one of two or more inputs optically coupled to said provider interface,
said provider interface optically coupled to said service provider's network, said third optical waveguide for optically conveying said second one or more optical data plane signals.

6. The system of claim 5 wherein said third optical waveguide is one of either an optical splitter, or an optical selector further coupled to said provider controller.

7. The system of claim 4 further comprising:
a fourth optical waveguide with one of one or more outputs optically coupled to said provider interface and with at least one of two or more inputs optically coupled to said service provider's network,
said provider interface optically coupled to said customer interface,
said fourth optical waveguide for optically conveying said second one or more optical data plane signals.

8. The system of claim 7 wherein said fourth optical waveguide is one of either an optical splitter, or an optical selector coupled to said provider controller.

9. The system of claim 1 further comprising a third optical waveguide for optically conveying said one or more optical data plane signals, with one of one or more outputs optically coupled to said provider interface, and with at least one of two or more inputs optically coupled to either said customer interface if said first optical waveguide is not present, or to said at least one of two or more outputs of said first optical waveguide.

10. The system of claim 9 wherein said third optical waveguide is one of either an optical splitter, or an optical selector further coupled to said provider controller.

11. The system of claim 5 further comprising:
a fourth optical waveguide with one of one or more inputs optically coupled to said provider interface, and with one of one or more outputs optically coupled to said at least one of two or more inputs of said third optical waveguide,
said fourth optical waveguide for conveying said second one or more optical data plane signals.

12. The system of claim 4 further comprising a protection waveguide for optically conveying said second one or more optical data plane signals, with at least one of two or more outputs optically coupled to said customer interface and with an input optically coupled to said service provider's network.

13. The system of claim 12 wherein said protection waveguide is one of either an optical splitter, or an optical selector further coupled to said provider controller.

14. The system of claim 1 further comprising a hot standby transceiver with an output for optically transmitting a first optical standby signal to a second one of said two or more inputs of said first protection switch.

15. The system of claim 14 further comprising a third optical waveguide with at least one input optically coupled to said output of said hot standby transceiver and one of at least two outputs optically coupled to said second one of said two or more inputs of said first protection switch.

16. The system of claim 12 further comprising a hot standby transceiver comprising an input for receiving a second optical standby signal from a second of said two or more outputs of said protection waveguide.

17. The system of claim 16 further comprising an third optical waveguide with at least one of two or more inputs optically coupled to said second of said two or more outputs of said protection waveguide and with an output optically coupled to said input of said hot standby transceiver.

* * * * *